(12) United States Patent
Schnuckle

(10) Patent No.: US 7,485,025 B2
(45) Date of Patent: Feb. 3, 2009

(54) EXPRESSIVE EYES WITH DILATING AND CONSTRICTING PUPILS

(75) Inventor: Gary Schnuckle, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 283 days.

(21) Appl. No.: 11/608,351

(22) Filed: Dec. 8, 2006

(65) Prior Publication Data

US 2008/0139082 A1 Jun. 12, 2008

(51) Int. Cl.
*A63H 3/38* (2006.01)

(52) U.S. Cl. ...................... 446/392; 446/343

(58) Field of Classification Search ........... 351/205, 351/206, 203, 204, 211, 212, 221, 223, 246; 446/392, 393, 394, 342, 343, 344, 345, 347, 446/348, 352, 389
See application file for complete search history.

(56) References Cited

U.S. PATENT DOCUMENTS

| | | | |
|---|---|---|---|
| 3,590,521 A * | 7/1971 | Samo | 446/343 |
| 4,842,566 A * | 6/1989 | Nagao | 446/345 |
| 6,139,577 A | 10/2000 | Schleipman et al. | |
| 6,391,057 B1 | 5/2002 | Schleipman et al. | |
| 6,576,013 B1 | 6/2003 | Budman et al. | |
| 6,669,727 B1 | 12/2003 | Young | |
| 6,705,918 B1 * | 3/2004 | Chang | 446/392 |

* cited by examiner

*Primary Examiner*—Hung X Dang
*Assistant Examiner*—Tuyen Q Tra
(74) *Attorney, Agent, or Firm*—Marsh Fischmann & Breyfogle LLP; Kent A. Lembke

(57) ABSTRACT

An assembly is provided for simulating the dilating and constricting of a pupil of an eye. The assembly includes a shell that is at least translucent to light and a dilation mechanism with a deformable member positionable to contact an inner surface of the shell. An actuator is provided in the dilation mechanism to move the deformable member toward and away from the inner surface, which causes the size of a contact area between the inner surface and a lip of the deformable member to vary over a preset range. The assembly includes a light source directing light onto the inner surface of the shell. The deformable member dynamically blocks light from reaching the inner surface, creating a pupil or dark hole. The light may be an ultraviolet light and the deformable member contacts a pattern or artwork on the inner surface including portions that glow in ultraviolet light.

18 Claims, 6 Drawing Sheets

EXPRESSIVE EYES WITH DILATING AND CONSTRICTING PUPILS

BACKGROUND OF THE INVENTION

1. Field of the Invention

The present invention relates, in general, to special effects for movies, animatronics, toys, and other applications relating to adding realism to artificial eyes and, more particularly, to devices that mimic or simulate natural constriction and dilation of a pupil in an eye.

2. Relevant Background

Surprisingly, there are large numbers of applications for "expressive" artificial or animatronic eyes that function similarly to the eye they are imitating. For example, the movie industry often has to build a creature such as dinosaur, an alien, a robot, or other character that has eyes that behave as expected for that particular creature. Realistic eyes are also often desirable in toys such as in stuffed animals and robotic characters. If an eye is fixed or unchanging, the overall effect provided by the creature or character quickly loses its effectiveness. Expression is sometimes provided by moving an entire eye to look another direction or by moving the surrounding skin or features such as mechanical eyelids or eyebrows.

To obtain more realistic eye effects, it is desirable to imitate the internal functioning of the eye including changes of the pupil. For example, in the human eye, the iris is a colored ring that surrounds the pupil, which appears as a black hole in the middle of the iris. The pupil is dilated or expanded in size by movement of the iris that is activated by muscles to allow more light into the eye such as when conditions are dark, and the pupil is contracted or shrunk in size to decrease the amount of light entering the eye such as when the eye is exposed to bright light. To imitate human eyes, it is desirable to selectively change the size of the pupil or to dilate and constrict the pupil (or surrounding iris). Alternatively, it is desirable to effectively simulate such dilation and contraction of the pupil to make the eye appear to be expressive or at least reactive to light conditions.

Existing pupil simulation techniques have generally concentrated on mechanical shuttering effects similar to movement of the iris or have used relatively complex electronic circuitry to change a size of a displayed pupil. While providing some desirable special effects including more life-like eyes, there is an ongoing demand for expressive eye devices that effectively simulate the dilating and constricting of a pupil. Preferably, such devices provide for selective or automated control of pupil size and are relatively simple and inexpensive to fabricate, install, maintain, and operate.

SUMMARY OF THE INVENTION

To create an effect of a constricting and dilating or expressive pupil, an eye assembly is provided that includes a deformable member or resilient plunger that is selectively compressed against an inner surface of an eye. This creates the illusion of a functioning iris as because the eye includes a shell such as a transparent plastic, glass, or ceramic globe or semi-spherical shape that includes a pattern on its inner surface that is entirely or partially formed with fluorescent paint or other materials that glow or are illuminated when exposed to ultraviolet or black light. The eye assembly further includes an ultraviolet light source directing light onto the pattern on the inner surface of the shell and a dilation mechanism that dynamically or selectively blocks the ultraviolet light from striking the pattern. A pupil or dark spot is formed on the shell where the ultraviolet light is blocked or masked. The dilation mechanism includes an actuator (e.g., linear or other arrangement such as a sweeping arm) that is attached to the deformable member or resilient plunger to move the member from a first position where it barely contacts the inner surface (i.e., a fully constricted pupil position) to a second position where the member or plunger contacts the inner surface over a much larger area (i.e., a fully dilated pupil position). In some cases, the linear actuator is operated by a controller based on ambient light levels on an exterior surface of the of the shell to simulate functioning of a typical eye and/or based on control signals to achieve desired expressions or operations (e.g., to simulate surprise or other states that cause pupil constriction or dilation) in a controllable manner. In other cases, the dilation mechanism and its actuator are gravity operated (e.g., when eye assembly is tipped such that the deformable member is below the actuator or is operated manually (e.g., when a toy, stuffed animal, or structure containing the eye assembly is squeezed or operated in a particular manner or a switch or lever is moved).

More particularly, an assembly is provided for simulating the dilating and constricting of a pupil within an eye. The assembly includes a shell made of a material that is at least translucent to light such as a plastic, glass, or ceramic. The assembly also includes a dilation mechanism that includes a deformable member that is positioned to contact an inner surface of the shell. An actuator is provided in the dilation mechanism that is connected to the deformable member. The actuator, such as a linear actuator linearly moving a shaft attached to the deformable member, move the deformable member toward and away from the inner surface. This movement causes the size of a contact area between the inner surface and a tip of the deformable member to vary over a preset range (i.e., between a minimum area and a maximum area corresponding to fully constricted and fully dilated pupil positions). The assembly typically further includes a light source that directs light onto the inner surface of the shell and the deformable member acts to block or mask at least some of the light from reaching the inner surface in the contact area. The light may be an ultraviolet light and the contact area may be located within a pattern including portions that glow when illuminated with ultraviolet light (e.g., that are formed with fluorescent paint or similar materials). For example, the shell may be a semi-spherical wall with a pattern on the inner surface of this wall and the contact area may be provided relatively centrally in the pattern/wall to simulate the location of a pupil in the center of an eye. A supplemental light source may be included and used to direct light onto the side of the deformable member (e.g., one or more colored light emitting diodes (LEDs) may be used to pulse the member sides to simulate muscle contractions with light that changes in brightness such as periodically washing up and down in brightness or doing so concurrently with changes in the contact area size). In some embodiments, a colored liquid is provided in the shell to provide the color or effect of an iris rather than or in addition to the use of black light artwork on the inner surface of the shell. A dilating and constricting pupil is created when the deformable member moves and displaces a portion of the liquid at the contact area.

DETAILED DESCRIPTION OF THE PREFERRED EMBODIMENTS

Briefly, the present invention is directed to an eye assembly or device for simulating a functioning eye or an "expressive eye." The eye assemblies of the invention achieve this goal by including a dilation mechanism that simulates the contracting and diluting pupil of an eye, e.g., of a human, animal, or other eye. Briefly, this is achieved by selectively blocking light from a light source from reaching the inner surfaces of a shell or cover used to represent an eye. The light source may be standard lighting but more typically is light from an ultraviolet (UV) source(s) and a pattern or artwork layer is provided on the inner surface of the shell (or a lens portion of such a shell) such as a design that represents eye features such as an iris using UV or clear fluorescent paints. The light is blocked using an actuator that forces a resilient plunger or deformable member against the inner surface of the shell. In this manner, a pupil is displayed by blocking light that strikes the inner surface of the shell, and the size of the pupil can be controlled and changed over time such as with the use of a linear actuator moving the resilient plunger toward and away from the shell.

Figure 1A:
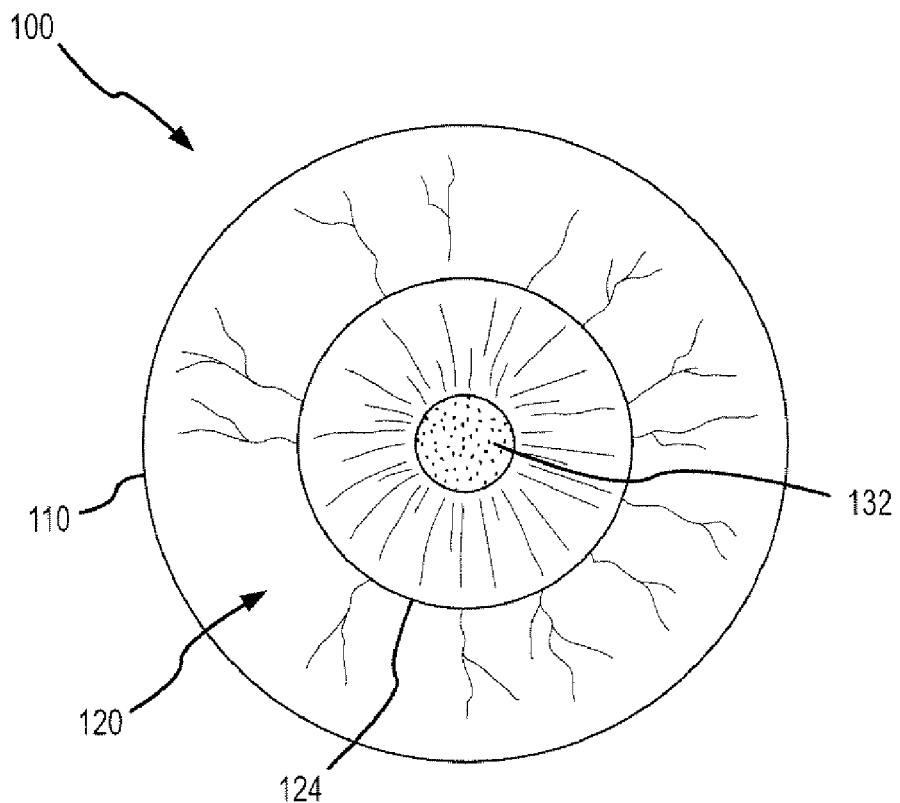
FIGS. 1A and 1B are front views of an eye assembly of the present invention illustrating a dilation mechanism in a constricted position and in a dilated position, respectively.
Figure 1B:
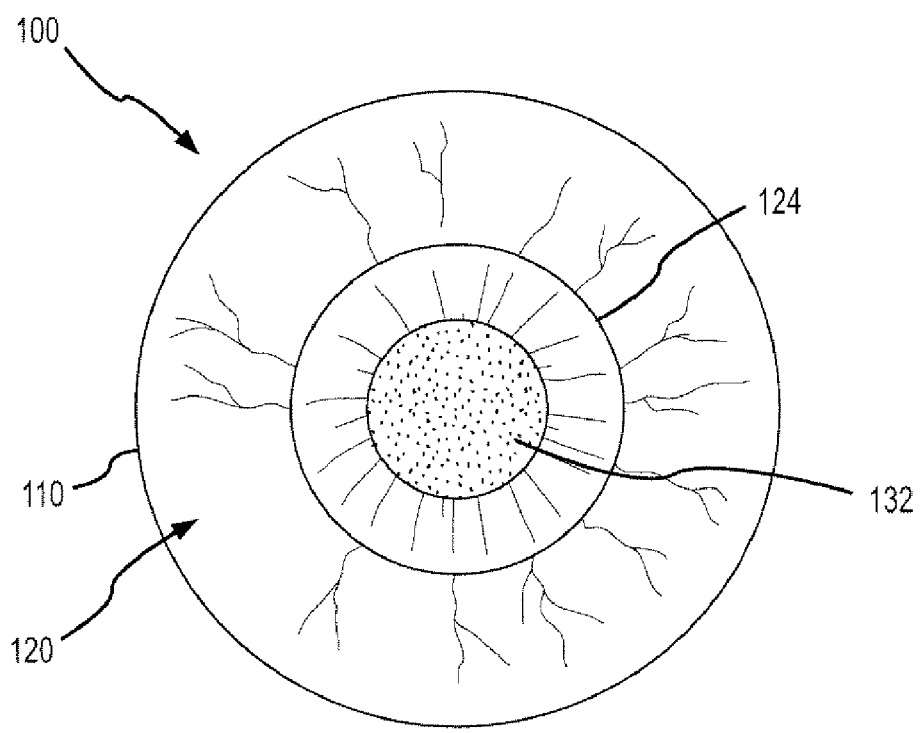

FIGS. 1A and 1B illustrate frontal views of an eye assembly 100 according to an embodiment of the invention. In FIG. 1A, the eye assembly 100 is in a constricted or reduced-size pupil position while in FIG. 1B the eye assembly 100 is in a diluted or expanded-size pupil position. The eye assembly 100 includes a shell 110 that may be formed of a plastic, glass, ceramic, or other material that allows light to pass (e.g., that is clear to at least partially translucent to light). The shell 110 may be provided with a color (e.g., a colored plastic or glass) but more often is substantially "clear" in color or lacking color. The shell or cover 110 may generally be spherical in shape and be formed a portion of a globe or other spherical shape. In other embodiments, the shell 110 is not spherical and is another curved shape or may even be chosen to have a planar surface.

To achieve a realistic eye effect, the eye assembly 100 includes a pattern or design 120 that is painted onto or otherwise applied (e.g., with a decal(s) or the like) to the shell 110. The pattern or design 120 may be provided on the inside, outside, or both sides of the shell 110. In one embodiment, the pattern or design 120 is provided on the inner surface of the shell 110 and includes artwork selected to simulate a particular type of eye. For example, the pattern or design 120 may be configured to imitate a human eye and include a white portion with red lines (e.g., blood shot eye patterns). The pattern 120 further preferably includes a centrally positioned iris pattern 124, which for a human eye embodiment may have a color such as brown, blue, green, and the like and striations or variations to more closely simulate real human eyes. Alternatively, the pattern 120 may be configured to imitate a fish eye, a reptile eye, a mammal eye, or an imaginary eye (e.g., not necessarily limited to an actual eye pattern).

A pupil is formed in the center of the pattern 120 and, as shown, in the center of the iris 124 with a resilient plunger or deformable member 132. The plunger 132 typically is positioned to contact the inner surface of the shell 110 within the pattern 120 so as to block light from striking the inner surface of the shell and striking the pattern 120. In the constricted position of FIG. 1A, the plunger 132 creates a very small pupil effect as it contacts the inner surface of the shell 110 over a first, relatively small area. The shape of the contact area is circular in shape in the illustrated embodiments to better simulate a pupil shape for most eyes, but the shape may be more irregular or differ to provide a desired effect (e.g., to provide a pupil with a shape that matches a particular eye such as more oval, elliptical, or the like). In the dilated position shown in FIG. 1B, the plunger 132 creates a larger pupil effect as it contacts the inner surface of the shell 110 over a second, relatively large area. Generally, it is desirable that the contact area between the plunger 132 and the inner surface of the shell 110 be selectable by movement of the plunger 132 relative to the shell 110 so as to provide a range of contact areas from the first contact area shown in FIG. 1A to the second contact area shown in FIG. 1B (i.e., to provide a range of pupil sizes to cause the eye assembly 100 to appear to be a functioning eye or an expressive eye).

Figure 2A:
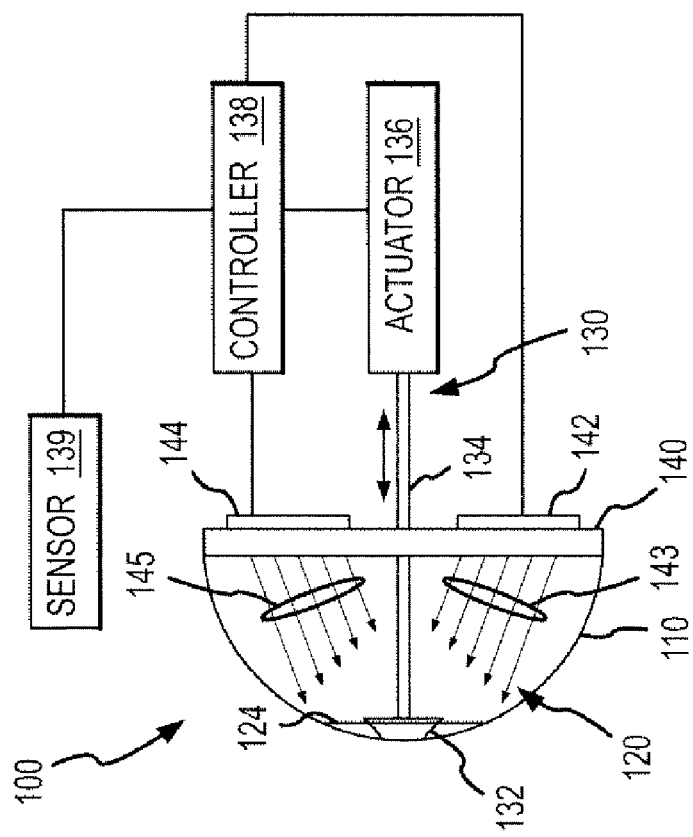
FIGS. 2A and 2B are side views of the eye assembly of FIGS. 1A and 1B further illustrating with functional blocks additional components of the dilation mechanism of the invention including an actuator, a controller, and an optional light level sensor.
Figure 2B:
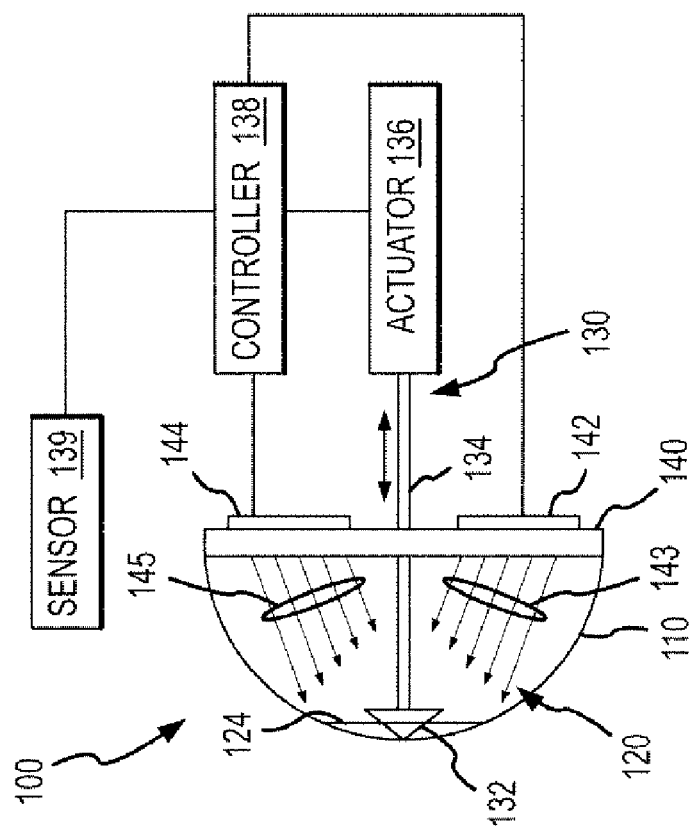

FIGS. 2A and 2B illustrate side views of the eye assembly 100 corresponding to the constricted and dilated positions shown in FIGS. 1A and 1B. FIGS. 2A and 2B combine side views of the shell 110 and included components of the assembly 100 with functional block illustrations of other portions of the dilation mechanism 130, with the specific physical implementation of these components not being limiting of the invention. As shown, the assembly 100 further includes a dilation mechanism 130 that functions to control the positioning of the resilient plunger 132 relative to the inner surface of the shell 110. Specifically, the dilation mechanism 130 is configured to move the plunger or deformable member 132 between the constricted or first position shown in FIGS. 1A and 2A in which the contact area is at a first relatively small value and the dilated or second position shown in FIGS. 1B and 2B in which the contact are is at a second relatively large value (and positions there between).

The dilation mechanism 130 may take a number of forms to practice the invention but generally includes a resilient plunger or deformable member 132, a positioning rod or shaft 134 that extends from the back (or non-contact) surface of the member 132 through the interior volume of the shell 110 through an opening in a back or mounting wall 140 of assembly 100 to where it is connected to an actuator 136. The actuator 136 functions to move the rod or shaft 134 and, therefore, the connected member 132 over the range of positions between the fully constricted position shown in FIGS. 1A and 2A and the fully dilated position shown in FIGS. 1B and 2B. In one embodiment, the actuator 136 is a linear actuator such as a belt, ball screw, acme screw, or linear motor actuator, an air actuator that uses a piston or other device to move the rod 134, or any other arrangement to selectively position the rod 134 and attached resilient plunger 132 relative to the shell 110. In other words, the term "actuator" for element 136 is intended to be broadly construed to cover numerous positioning devices with linear actuators that use electric motors to produce rotational motion to spin a gearbox that is connected to a threaded shaft 134 being only one example of a useful implantation for easily controlled linear motion and exact positioning of the plunger 132. In other embodiments, a non-linear actuator is used such as an arm attached to the resilient plunger 132 that pivots about a point to sweep through an arc and deform the plunger 132. In some embodiments, the actuator 136 is a simple gravity-based actuator such that the pupil varies in size based on the eye shell's position relative to horizontal (e.g., to be at a mid position when at horizontal, to be at fully dilated when at 90 degrees to horizontal with the plunger 132 hanging "down", to be at fully constricted when at 90 degrees from horizontal with the plunger being aimed "up", and so on). In other embodiments, the actuator 136 is activated manually. For example, the actuator 136 may operate in response to a stuffed animal, toy, or other containing the assembly 100 being squeezed (e.g., to dilate the pupils in "surprise" or "pain" when hugged) or otherwise operated (e.g., when a joystick, lever, switch, or the like is moved to select the amount of dilation by controlling movement of actuator and rod 134).

A controller 138 is provided in the dilation mechanism 130 for controlling operation of the actuator 136 and thus the positioning of the plunger 132. For example, the controller 138 may operate to determine the timing of the operation of the actuator 136 to move the rod 134 as well as the direction of movement linear movement of the rod 134. In some cases, the speed of the actuator 136 is also selectively controllable by the controller 138, e.g., to slowly or more quickly constrict or dilate an eye as may be desirable when light conditions rapidly change or to show surprise or other "expressions." In some embodiments, a sensor 139 such as a light level sensor is provided to sense levels of light in the surrounding environment in which the assembly 100 is positioned. The sensor 139 provides its output signals to the controller 138, which may process the signals to determine the ambient light levels for the eye assembly and to issue control signals to the actuator 136 to change the position of the rod 134 and attached plunger 132 based on the sensed/determined light levels (e.g., to constrict the pupil as shown in FIG. 2A in response to brighter ambient light levels and to dilate the pupil as shown in FIG. 2B in response to lower ambient light levels). The controller 138 may include one or more computer programs or routines for processing the sensor signals and operating the actuator 136 in response. The controller 138 may further be attached or in communication with additional control devices that may transmit operation signals that are used to set the position of the plunger 132 and to operate the actuator 136 (e.g., to allow an operator to actively control the size of the pupil, to allow the actuator 136 to be operated based on additional external stimuli or based on an overall effect, or the like).

The shell or cover 110 is attached to a back or mounting wall 140, which may be circular or other shapes and typically is a solid color such as white to provide a background for the artwork or design 120. The assembly 100 includes a light source that may be mounted onto the wall 140 so as to extend through or to direct light through the wall 140. As shown, lights 142, 144 are used to generate light rays 143, 145 that are directed into the shell interior toward the artwork or design 120 and specifically toward the inner or central pattern or iris 124 of the pattern 120. As discussed, the resilient plunger or deformable member 132 acts to dynamically mask or block the light 143, 145 from reaching or striking the artwork or pattern 120 within the central or iris portion 124 to create a pupil effect with varying size, e.g., varying diameter. The light sources 142, 144 may be conventional white light or similar sources/bulbs but more typically are UV or black lights and the artwork 120 is or includes a portion that is only visible when exposed to UV or black light rays 143, 145. For example, the patterns 120 may be or include fluorescent paint that glows under ultraviolet or black light (e.g., as it absorbs rays 143, 145 in the UV wavelength ranges such as near 350 nm), and may include an optional white base coat (or this coat may be used about the iris 124). Again, the color may vary to select the color of the iris or central portion 124 such as blue, green, brown, other colors, and/or combinations of such colors.

Figure 3:
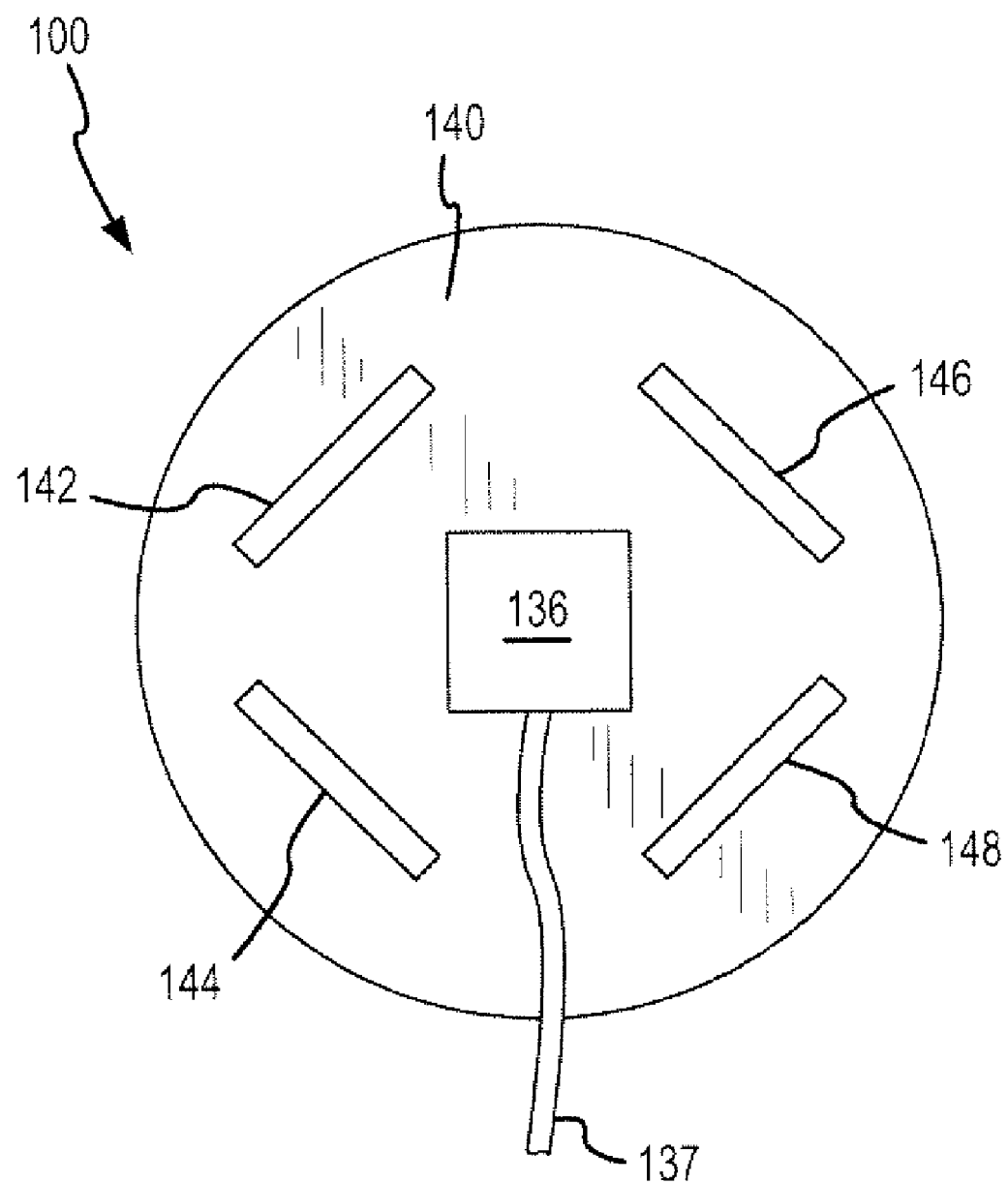
FIG. 3 illustrates the back or rear side of the eye assembly of FIGS. 1A to 2B showing exemplary placement of light sources (e.g., ultraviolet or black lights/tubes) about the linear actuator.

The lights 142, 144 may be black light lamps, mini-black light or fluorescent tubes, UV light emitting diodes (LEDs) of varying power ranges (e.g., brightness ranges). In some embodiments, the controller 138 operates not only to power the lamps 142, 144 on and off but also as a rheostat to adjust the brightness of the lamps 142, 144 to achieve differing and controllable effects with the eye assembly 100. FIG. 3 illustrates a back or rear view of the eye assembly 100 shown in FIGS. 1A-2B. As shown, the light source is provided by the use of four UV or black light lamps, bulbs, or tubes 142, 144, 146, and 148 that are mounted onto the wall 140 and are positioned in a spaced apart arrangement (e.g., generally providing the sides of a square). The specific pattern and number of the tubes 142, 144, 146, and 148 may be varied to practice the inventions such as ranging from one to ten or more and being arranged as shown to provide light rays about the periphery of shell 110, be provided on one side of the shell 110, or numerous other arrangements that direct UV or other light rays 143, 145 toward the artwork or pattern 120. Also shown in FIG. 3 is the actuator 136 and a power/control line 137 connected to the actuator 136, which shows that the actuator 136 is generally positioned along the central axis of the shell 110 and the attached wall 140.

The resilient plunger or deformable member 132 generally functions to block differing amounts of light its contact area with the back or inner surface of the shell 110. The contact area between the plunger 132 and shell 110 is variable because the plunger 132 is formed of a deformable and preferably resilient material. For example, the plunger 132 may be formed of a rubber or a plasticized solid (such as a soft silicon or similar material). The plunger 132 may be any color to practice the invention with black being useful in many embodiments. The plunger 132 may be a solid or may be hollow. If hollow, the plunger 132 may be filled with a gas or liquid similar to a balloon.

Figure 6A:
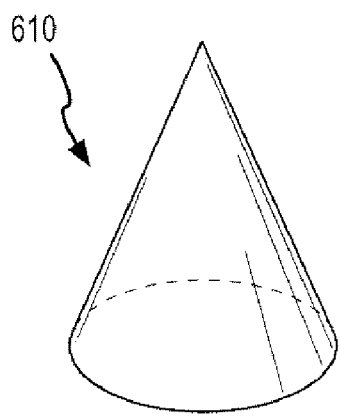
FIGS. 6A-6E illustrate perspective views of five alternative implementations of a plunger or deformable pupil element for use with dilation mechanisms of the present invention.
Figure 6B:
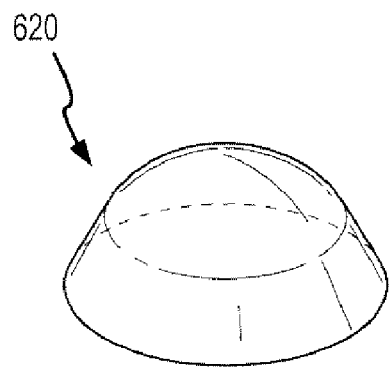
Figure 6C:
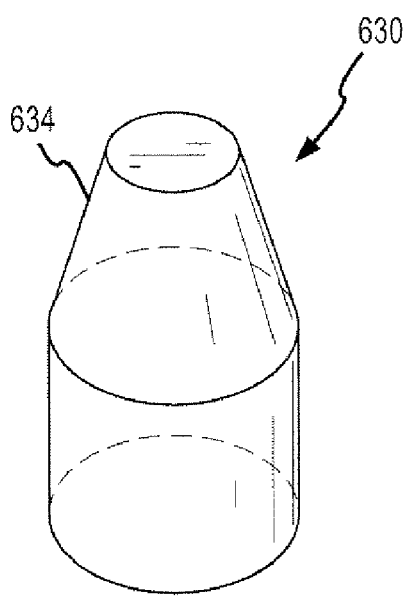
Figure 6D:
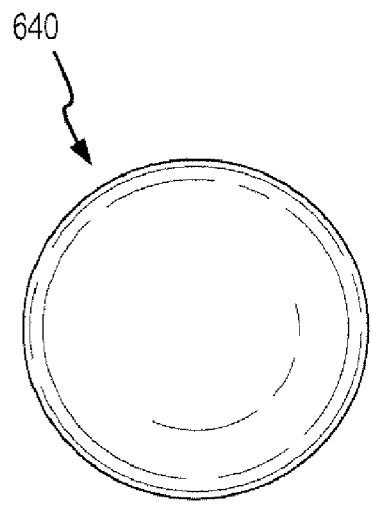
Figure 6E:
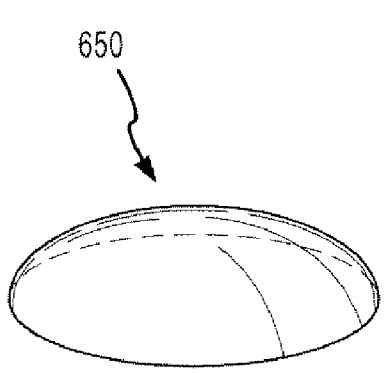

In addition to a wide material selection being used for plunger 132, the plunger 132 may take numerous shapes to practice the invention and provide the dilating pupil effect. FIGS. 1A-3 show the plunger 132 as being frustoconical in shape (i.e., a cone with a tip missing) as this shape is useful for providing a circular pupil of a particular diameter upon initial contact and providing an expanding diameter pupil as the plunger 132 is pressed harder against the inner surface of the shell 110 by the actuator 136 (i.e., moved from a fully constricted position shown in FIGS. 1A and 2A to a fully dilated position shown in FIGS. 1B and 2B). FIGS. 6A to 6D show some other useful shapes and/or configurations for the plunger or deformable element of the dilation mechanism 130. In FIG. 6A, a conical plunger 610 is shown while in FIG. 6B a semi-spherical plunger 620 is shown, and either plunger 610, 620 is useful for creating circular pupils in eye assemblies of the present invention. FIG. 6C illustrates a plunger 630 that combines a frustoconical tip 634 that would be used to contact the inner surface of the shell 110 with a cylindrical body 638 that would be attached to the rod or shaft 134 of the dilation mechanism 130. Of course, the other shapes such as the conical shape, the semi-spherical, and the like may be used for the tip 634. FIG. 6D shows another plunger or deformable member 640 that is generally spherical in shape as may be case when the plunger 640 is air or liquid filled. FIG. 6E shows another plunger or deformable member 650 that is similar to member 620 but with an elliptical or oval cross section which may be useful for use in eyes with non-circular pupils such certain animals and/or reptiles.

Figure 4:
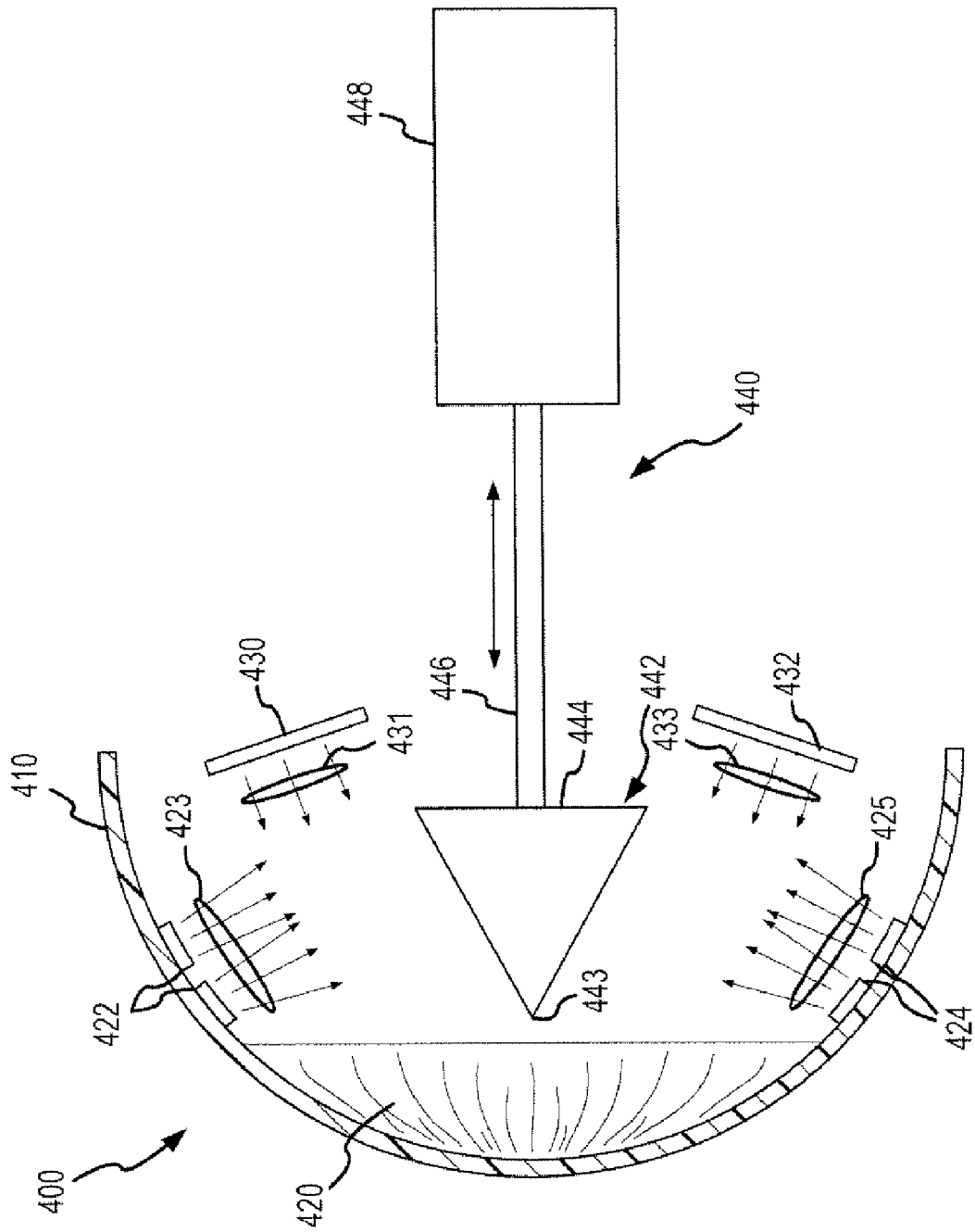
FIG. 4 is a partial illustration of another embodiment of an eye assembly of the present invention illustrating the cover or shell in cross section to provide a view of light sources directed toward the deformable element of the dilation mechanism to achieve additional effects such as movement of muscle within the eye during contraction and dilation.

FIG. 4 illustrates another eye assembly or dilating pupil effect system 400 according to the invention. The assembly 400 includes a shell or cover 410 with a pattern or artwork 420 provided on an inner surface, e.g., an iris pattern or other eye effects such as veins with clear UV fluorescent paint, decals, or the like. A dilation mechanism 440 is provided that includes a deformable member 442 with a tip 443 for contacting the inner surface of the shell 410 within the pattern 420 to create a pupil or dark/black spot or area by blocking light rays from the light source of the assembly 400. The member 442 includes a back side distal to the tip 443 to which a positioning rod or shaft 446 is attached or through which such shaft 446 extends. The rod 446 is provided linear motion by an actuator 448 to control the position of the tip 443 and member 442 relative to the pattern 420 and inner surface of shell 410 to vary the size of the contact area between the member 442 and shell 410.

The assembly 400 differs in part from the assembly 100 in that a supplemental light source is provided to create additional eye functions or effects. As shown, rear light sources 430, 432 such as UV or black light tubes are provided to provide UV light 431, 433 that is directed toward the pattern 420 (e.g., toward the pattern 420 that includes at least some fluorescent artwork that glows in UV light). Additionally, supplemental side light sources 422, 424 are provided such as on the side of the shell 410 (on the inner surface as shown or exterior to the shell 410) to direct light rays 423, 424 more directly onto the deformable member 443. This creates an effect that if properly controlled simulates muscular contractions or movement of an iris or other portion of the eye assembly 400. The light sources 422, 424 may be UV or black light sources with fluorescent artwork provided on the sides of the member 442. In other embodiments, the light sources 422, 424 are not UV light sources and may be, for example, LEDs or other white or colored light sources (e.g., a red or other colored LEDs may be used effectively for sources 422, 424). Typically, the sources 432, 432, 422, 424 would operate concurrently but the light levels of one or more of the sources may be varied. For example, it may be desirable to wash the LEDs or other sources 422, 424 up and down in brightness levels periodically/randomly or during the movement of the actuator 448 (or even to flash quickly on and off) such that the muscle contractions are timed with or correspond with the constricting or dilating of the pupil created by varying contact area of the tip 443 against the pattern 420 on the shell 410. Such selective control may be provided by control signals from a controller (such as controller 138 of FIGS. 2A and 2B or another control device).

Figure 5:
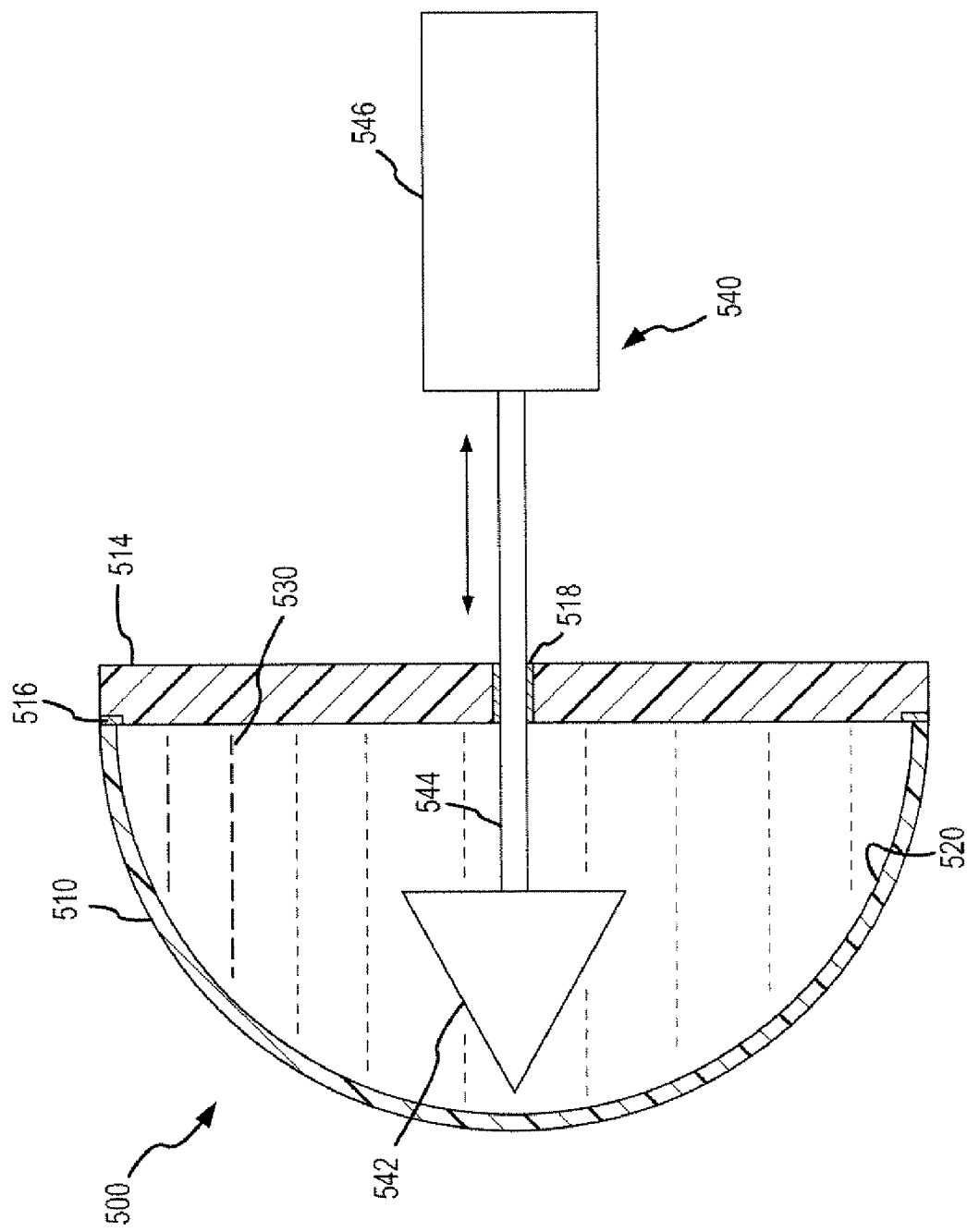
FIG. 5 is a sectional view similar to FIG. 4 of another embodiment of an eye assembly that provides a colored liquid in the interior of the shell or cover that is displaced by the plunger or deformable element of the dilation mechanism to produce a diluting and contracting pupil effect.

FIG. 5 illustrates another embodiment of a dilating pupil effect system or eye assembly 500 of the present invention. As shown, the assembly 500 is similar to the assemblies 100 and 400 in that it includes a shell 510 and an attached back or mounting wall 514. Also, a dilation mechanism 540 is provided with an actuator 546 that provides linear motion or positioning for a shaft 544 that is in turn attached to resilient plunger or deformable member 542 (e.g., an solid or hollow device made from an elastomeric material or other resilient material), which is pressed against the inner surface 512 of the shell to provide a constricting and dilating pupil effect.

The embodiment 500 differs from the other embodiments 100, 400 in that shell 510 is partially or completely filled with a liquid or a gas 530. For example, a colored but transparent to translucent liquid or gas may be used for the filler 530 to achieve a desired effect. In some cases, no pattern or artwork would be provided on the surface 512 but may optionally be provided on the back wall 514 or objects may be provided to float and move about in liquid 530. In other embodiments, the liquid 530 is combined with light sources that may be provided to illuminate all or portions of a pattern or artwork on the inner surface 512 such as UV lights to cause clear UV fluorescent paint or the like on the surface 512 when they are not blocked or covered by the plunger 542. When the filler 530 is used, it is desirable for the shell 510 and wall 514 to be sealed (e.g., to be liquid or air tight). In this regard, the assembly 500 may include a seal 516 (e.g., an elastic gasket or sealing member such as O-ring or the like) and seal(s) 518 in the passage in the wall 514 for rod or shaft 544. During operation of the assembly 500, the plunger 542 pushes the filler 530 such as a colored liquid to create the effect of a pupil, which can be varied in size by linear motion of the rod 544 by actuator 546, e.g., the iris portion of the eye is the fluid 530 so may be blue, brown, green or the like. In some cases, the liquid 530 is only provided in a portion of the shell (e.g., a lens portion or iris portion) and the plunger 542 and a portion of the rod 544 are also provided in this shell portion. In another embodiment, the wall that separates the liquid portion the rest of the interior volume of the shell is flexible and the plunger 542 is positioned outside this liquid bag or shell portion and presses upon the flexible wall rather than on the inner surface 512 of the shell 510 to displace liquid and create a pupil effect.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The figures only show a single eye that is used as a standalone effect. However, the eye assemblies of the present invention are intended for use alone and, more typically, as a subpart or subassembly of a larger system or product. For example, an animatronic figure may be provided that has one, two, or more eyes that include the eye assembly 100, 400, and/or 500 described above. Similarly, the assemblies 100, 400, 500 may be provided in displays or be included in numerous products such as stuffed animals, dolls, or other toys. With this wide range of implementations in mind, the dimensions of the various components such as the shell, the deformable member, and the positioning rod or shaft may vary significantly to practice the invention. For example, in a large animated character the rod may be one to three feet or more in length and 0.25 to 1 inch or more in diameter with a correspondingly large shell having a diameter at the mounting wall of 1 to 4 feet or more. A plunger in these cases may be 4 to 8 inches or more in length and have a cross sectional dimension of 3 to 6 inches or more. In smaller implementations, the shell may be less than a few inches in diameter at the back wall and the plunger may just be fractions of an inch long and wide. Of course, these are exemplary dimensions that are useful for explaining the diverse uses and range of sizes the eye assemblies may use to successfully practice the teaching of the invention.

I claim:

1. An assembly for simulating a dilating and constricting pupil in an eye, comprising:

a shell comprising a material that is at least translucent to light; and a dilation mechanism comprising a deformable member positioned to contact an inner surface of the shell and an actuator connected to the deformable member moving the deformable member toward and away from the inner surface to vary a size of a contact area between the inner surface and the deformable member.

2. The assembly of claim 1, further comprising a light source directing light onto the inner surface of the shell, whereby the deformable member blocks the light from reaching the inner surface at least at the contact area.

3. The assembly of claim 2, further comprising a pattern on the inner surface including a portion that is illuminated when exposed to ultraviolet light and wherein the light source comprises an ultraviolet light source and wherein the contact area at least partially covers the ultraviolet light portion of the pattern.

4. The assembly of claim 1, wherein the shell comprises a semi-spherical wall, the ultraviolet light portion of the pattern is located in a center area of the wall, and the contact area is positioned in a center of the ultraviolet light portion of the pattern.

5. The assembly of claim 1, wherein the deformable member is formed of a resilient material and the deformable member has a position that is variable by the actuator from a first position in which the contact area is at a minimum value to a second position more proximate to the inner surface in which the contact area is at a maximum value.

6. The assembly of claim 5, further comprising a controller controlling the actuator to move the deformable member in response to ambient light levels proximate to an exterior surface of the shell.

7. The assembly of claim 1, further comprising a colored liquid contacting the inner shell and being at least partially displaced by the deformable member at the contact area.

8. The assembly of claim 1, further comprising a supplemental light source directing light onto a side of the deformable member.

9. An eye assembly operable to provide a dilating pupil effect, comprising:

a shell with an inner surface comprising a pattern formed with fluorescent materials;

a light source generating ultraviolet light directed toward the pattern on the inner surface of the shell; and a dilating mechanism with a plunger formed of resilient material that is positionable at a first position to contact the inner surface within the pattern over a first contact area, at a second position to contact the inner surface within the pattern over a second contact area that is greater in magnitude than the first contact area, and at positions between the first and second positions.

10. The assembly of claim 9, wherein the dilating mechanism further comprises a linear actuator attached to the plunger via a shaft, the linear actuator operating to selectively position the plunger at one of the plunger positions relative to the shell inner surface.

11. The assembly of claim 9, further comprising a supplementary light source focusing light onto a side of the plunger.

12. The assembly of claim 11, wherein the supplementary light source comprises a colored light emitting diode and further comprising means for varying a brightness of the light emitting diode.

13. The assembly of claim 9, wherein the resilient material is black and the plunger is conical, frustoconical, semi-spherical, or spherical in shape.

14. A method for creating a dilating pupil effect, comprising: providing a pattern including fluorescent material on a surface of a wall that is at least partially transparent to light; directing ultraviolet light toward the pattern; and blocking the ultraviolet light from illuminating a portion of the pattern, whereby the portion of the pattern appears as a dark hole in surround portions of the pattern illuminated by the ultraviolet light, wherein the blocking of the ultraviolet light comprises contacting the portion of the pattern on the wall surface with a plunger formed of deformable and resilient material.

15. The method of claim 14, wherein the blocking comprises altering the contacting of the wall surface with the plunger such that the portion of the pattern blocked from the ultraviolet light increases or decreases in size.

16. The method of claim 15, wherein the positioning of the plunger is performed by operation of a linear actuator with a movable shaft attached to the plunger.

17. The method of claim 16, wherein the linear actuator is operated in response to sensed ambient light proximate to the wall.

18. The method of claim 14, further comprising directing supplemental light onto a side of the plunger concurrently with the blocking of the ultraviolet light.

* * * * *